(12) United States Patent
Swinkels et al.

(10) Patent No.: US 9,197,355 B2
(45) Date of Patent: Nov. 24, 2015

(54) DROP PORT BASED SHARED RISK LINK GROUP SYSTEMS AND METHODS

(71) Applicants: Gerard Leo Swinkels, Ottawa (CA); David Man-Wah Yeung, Nepean (CA)

(72) Inventors: Gerard Leo Swinkels, Ottawa (CA); David Man-Wah Yeung, Nepean (CA)

(73) Assignee: Ciena Corporation, Hanover, MD (US)

(*) Notice: Subject to any disclaimer, the term of this patent is extended or adjusted under 35 U.S.C. 154(b) by 343 days.

(21) Appl. No.: 13/685,831

(22) Filed: Nov. 27, 2012

(65) Prior Publication Data

US 2014/0147107 A1    May 29, 2014

(51) Int. Cl.
| | |
|---|---|
| *H04J 14/02* | (2006.01) |
| *H04L 12/707* | (2013.01) |
| *H04L 12/715* | (2013.01) |
| *H04L 12/24* | (2006.01) |

(52) U.S. Cl.
CPC ............ *H04J 14/0273* (2013.01); *H04J 14/029* (2013.01); *H04J 14/0256* (2013.01); *H04L 45/24* (2013.01); *H04J 14/0286* (2013.01); *H04L 41/0896* (2013.01); *H04L 45/64* (2013.01)

(58) Field of Classification Search
CPC . H04L 41/0896; H04L 45/64; H04J 14/0286; H04J 14/0256
See application file for complete search history.

(56) References Cited

U.S. PATENT DOCUMENTS

| 6,996,342 B2 | 2/2006 | Park et al. | |
|---|---|---|---|
| 7,333,424 B2 | 2/2008 | Yamanaka et al. | |
| 7,701,848 B2 * | 4/2010 | Qiao et al. | 370/228 |
| 7,889,640 B2 * | 2/2011 | Bardalai | H04B 10/275 370/225 |
| 7,889,675 B2 | 2/2011 | Mack-Crane et al. | |
| 7,995,569 B2 | 8/2011 | Ashwood-Smith et al. | |
| 2002/0030864 A1 * | 3/2002 | Chaudhuri et al. | 359/110 |
| 2002/0063916 A1 * | 5/2002 | Chiu et al. | 359/118 |
| 2002/0109879 A1 * | 8/2002 | Wing So | 359/118 |
| 2005/0031339 A1 * | 2/2005 | Qiao et al. | H04L 41/0896 398/4 |
| 2011/0219128 A1 | 9/2011 | Swinkels et al. | |
| 2011/0222394 A1 | 9/2011 | Swinkels et al. | |
| 2011/0222846 A1 | 9/2011 | Boertjes et al. | |
| 2011/0222862 A1 | 9/2011 | Boertjes et al. | |
| 2011/0229123 A1 | 9/2011 | Li et al. | |
| 2011/0255443 A1 | 10/2011 | Ashwood-Smith et al. | |
| 2012/0076046 A1 * | 3/2012 | Lin | 370/254 |
| 2012/0224845 A1 | 9/2012 | Swinkels et al. | |

FOREIGN PATENT DOCUMENTS

| EP | 1845640 B1 | 4/2009 |
|---|---|---|
| EP | 1983712 B1 | 9/2010 |
| EP | 2467844 A1 | 8/2012 |

* cited by examiner

*Primary Examiner* — Xavier Szewai Wong
(74) *Attorney, Agent, or Firm* — Clements Bernard PLLC; Christopher L. Bernard; Lawrence A. Baratta, Jr.

(57) ABSTRACT

Drop port based shared risk link group (SRLG) systems and methods assign SRLG information to drop ports in another level or layer of a network. Thus, drop side SRLG information can be shared between different networks or layers enabling a combination with line side SRLG information within a network to identify and prevent single points of failure across the networks. Typically, SRLG details are assigned to line ports (NNI ports) within a network and this information is not shared with external networks or network layers for routing a connection through the network and the external networks. By assigning SRLG details to a drop port, this information can be relayed between the network and the external networks and considered when planning a route through all of the networks.

20 Claims, 9 Drawing Sheets

DROP PORT BASED SHARED RISK LINK GROUP SYSTEMS AND METHODS

FIELD OF THE INVENTION

Generally, the field of art of the present disclosure pertains to optical networking systems and methods, and more particularly, to drop port based shared risk link group (SRLG) systems and methods providing mechanisms to share SRLG details between different networks or network layers.

BACKGROUND OF THE INVENTION

Optical networks and the like (e.g., wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control plane systems and methods provide automatic allocation of network resources in an end-to-end manner. Exemplary control planes may include Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GM-PLS) Architecture as defined in Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections there between. Control plane systems and methods use bandwidth advertisements to notify peer nodes of available link capacity. The bandwidth advertisements exchange information over a dedicated and well known communication channel with peers on opposite ends of the communication link.

Operators typically deploy optical networks in a layered fashion having access, metro, regional, and/or core networks. In fiber constrained networks, network types (access, metro, regional, and/or core networks) may overlap to a point when one network's line port may be another network's drop port resulting in single points of failure. Conventionally, shared risk link group details (SRLG) are assigned to line ports (network-network interface (NNI) ports). However, overlapping networks occupying the same area are more common in fiber constrained networks and a single points of failure in the network because of incomplete understanding of the common SRLG in the networks. Generally, an SRLG is a concept that multiple different services may suffer from a common network failure if they are sharing a common failure risk such as, without limitation, a common fiber, a fiber conduit, common hardware, etc.

Of note, the different network types may utilize different control plane layers or some of the network types may not utilize control planes at all. In such an environment, service calls between networks may require diverse paths therethrough such as best-effort, maximally diverse, absolutely diverse, etc. Conventionally, there is no way to identify SRLG information between networks resulting in unpredictable failure modes, unidentified shared risks on connections spanning different networks, and the like.

BRIEF SUMMARY OF THE INVENTION

In an exemplary embodiment, a method includes determining all links at a first layer of a network; determining all links at a second layer of the network; assigning shared risk link group details to the links at the second layer inherited from the links at the first layer; assigning access in the first layer to associated links in the second layer; defining drop side port shared risk link group details to the links in the first layer based on the associated links in the in the second layer; and providing the drop side port shared risk link group details to the second layer. The method can further include operating a control plane in the second layer; and calculating paths over the links in the second layer via the control plane while considering shared risk link group details in the second layer. The shared risk link group details in the second layer can be based on line side interfaces of the links in the second layer. The method can further include initiating a call for a connection spanning the first layer and the second layer; providing the drop side port shared risk link group details associated with the connection; and calculating a path for the connection in the second layer utilizing the drop side port shared risk link group details to ensure absolute route diversity between the first layer and the second layer as a whole.

The method can further include propagating shared risk link group details from the first layer to a drop port in the second layer. The drop side port shared risk link group details in the first layer can be based on drop side ports of the links in the first layer. The drop side port shared risk link group details can include any of a fiber number, a fiber bundle identifier, and a conduit identifier. The first layer can include an access network and the second layer can include a core network, wherein each of the access network and the core network have at least one overlapping link providing a shared risk link group therebetween, and the method can further include: routing a connection spanning the access network and the core network with absolute route diversity guaranteed therebetween based on the drop side port shared risk link group details provided to a control plane in the core network. The first layer can include a wavelength division multiplexing (WDM) network and the second layer can include an Optical Transport Network (OTN) network, wherein each of the WDM network and the OTN network have at least one overlapping link providing a shared risk link group therebetween, and the method can further include: routing a connection spanning the WDM network and the OTN network with absolute route diversity guaranteed therebetween based on the drop side port shared risk link group details provided to a control plane in the OTN network.

In another exemplary embodiment, a network includes a first network including a first plurality of network elements interconnected by a first plurality of links; a second network including a second plurality of network elements interconnected by a second plurality of links; and a control plane operating within the second network; wherein each of the first plurality of network elements is assigned associated links in the second network for access thereto; wherein each of the first plurality of network elements comprise drop ports which have defined drop side port shared risk link group details based on the assigned associated links in the second network; and wherein the drop side port shared risk link group details are provided to the control plane for routing consideration thereof. The control plane can be configured to calculate paths over the second plurality of links while considering shared risk link group details in the second network. The shared risk link group details in the second network can be based on line side interfaces of the second plurality of links. The control plane can be configured to: initiate a call for a connection spanning the first network and the second network; receive the drop side port shared risk link group details associated with the connection; and calculate a path for the connection in the second network utilizing the drop side port shared risk link group details to ensure absolute route diversity between the first network and the second network as a whole. The control plane can be configured to: propagate shared risk link group details from the first network to a drop port in the second network. The drop side port shared risk link group details in the first network can be based on drop side ports of the first plurality of links. The drop side port shared risk link group details can include any of a fiber number, a fiber bundle identifier, and a conduit identifier.

Optionally, the first network can include an access network and the second network can include a core network, wherein each of the access network and the core network have at least one overlapping link providing a shared risk link group therebetween, and the control plane can be configured to: route a connection spanning the access network and the core network with absolute route diversity guaranteed therebetween based on the drop side port shared risk link group details provided to a control plane in the core network. Alternatively, the first network can include a wavelength division multiplexing (WDM) network and the second network can include an Optical Transport Network (OTN) network, wherein each of the WDM network and the OTN network have at least one overlapping link providing a shared risk link group therebetween, and the control plane can be configured to: route a connection spanning the WDM network and the OTN network with absolute route diversity guaranteed therebetween based on the drop side port shared risk link group details provided to a control plane in the OTN network.

In another exemplary embodiment, a network element includes one or more line ports; a switching mechanism between the one or more line ports; a controller communicatively coupled to the one or more line ports and the switching mechanism; and a control plane operating on the controller, wherein the control plane is configured to: receive or define shared risk link group information for links at a layer in which the network element operates; receive drop side port shared risk link group details from another network element operating at a different layer but sharing a connection through the network element; and calculate a path for the connection based on the shared risk link group information and the drop side port shared risk link group details thereby guaranteeing absolute route diversity for the connection through the layer and the different layer. The shared risk link group information can be based on line side interfaces in the layer, and wherein the drop side port shared risk link group details is based on drop side ports in the different layer.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, drop port based shared risk link group (SRLG) systems and methods assign SRLG information to drop ports. Thus, drop side SRLG information can be shared between different networks enabling a combination with line side SRLG information within a network to identify and prevent single points of failure across the networks. Typically, SRLG details are assigned to line ports (NNI ports) within a network and this information is not shared with external networks for routing a connection through the network and the external networks. By assigning SRLG details to a drop port, this information can be relayed between the network and the external networks and considered when planning a route through all of the networks.

Figure 1:
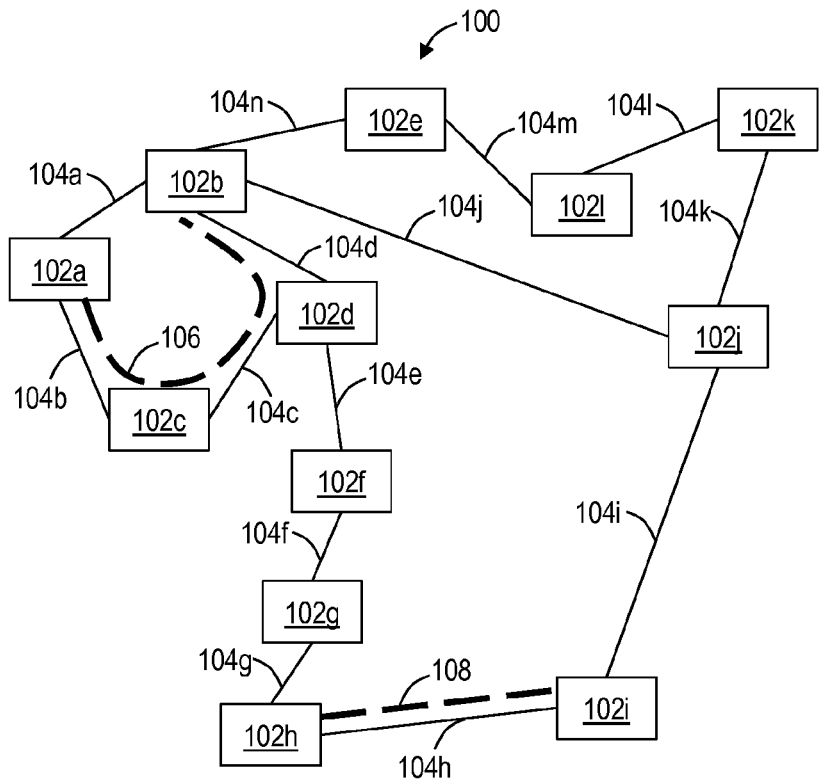
FIG. 1 is a network diagram of a network of various interconnected nodes showing connections at an access layer or network.
Figure 2:
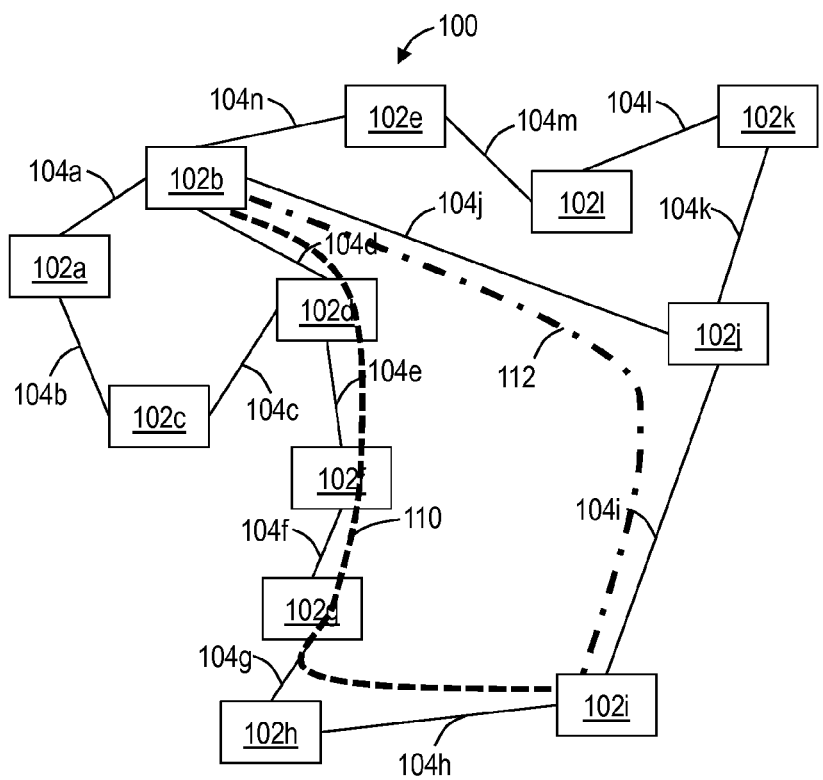
FIG. 2 is a network diagram of the network of FIG. 1 showing connections at a core layer or network.
Figure 3:
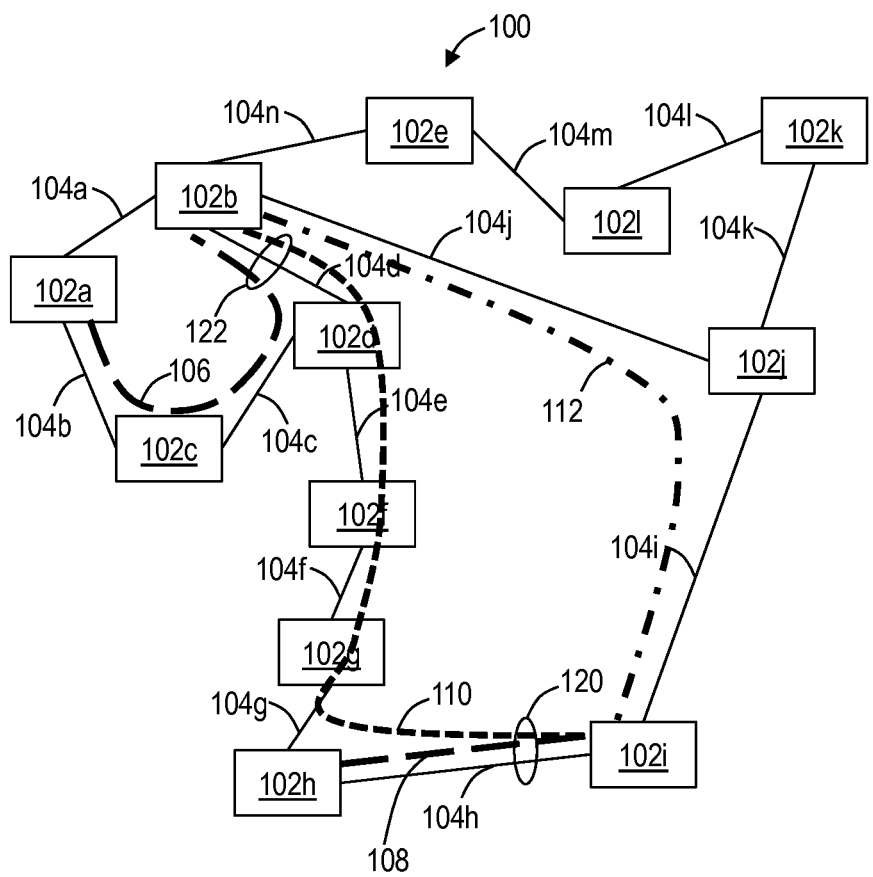
FIG. 3 is a network diagram of the network of FIGS. 1 and 2 showing connections at both the access and core layer or network.

Referring to FIGS. 1-3, in an exemplary embodiment, network diagrams illustrate a network 100 of various interconnected nodes 102a-102l. The nodes 102a-102l are physical locations such as, without limitation, central offices (COs), points-of-presence (POPs), collocation offices, customer locations, huts, and the like. The nodes 102a-102l are interconnected via links 104a-104n. The links 104a-104n can be optical fibers, and in this exemplary embodiment, each link 104a-104n is a SRLG, e.g., a failure bringing down the link 104d drops all connections between the nodes 102b, 102d over that link. The network 100, for illustration purposes, includes two exemplary layers: an access network and a core network. That is, the network 100 belongs to an operator, service provider, etc. with the operator operating the access network and the core network.

The access network and the core network are formed by network elements (NEs) which are located at the nodes 102a-102l and interface to the links 104a-104n for communication therebetween. Exemplary network elements include, without limitation, Optical Transport Network (OTN) add/drop multiplexers (ADMs), Synchronous Optical Network (SONET) ADMs, Synchronous Digital Hierarchy (SDH) ADM, multi-service provisioning platforms (MSPP), digital cross-connects (DCS), optical cross-connects, optical switches, routers, Ethernet switches, wavelength division multiplexing (WDM) terminals, access/aggregation devices, and the like. Also, the network elements can operate a control plane (e.g., ASON, GMPLS, OSRP, etc.) therebetween. In an exemplary embodiment, the network elements can provide optical interfaces over the links 104a-104n.

FIG. 1 illustrates the network 100 showing two connections 106, 108 that are part of the access network. Specifically, the connection 106 is between the nodes 102a, 102b traversing the links 104b, 104c, 104d. The connection 108 is between the nodes 102h, 102i traversing the link 104h. For example, the connections 106, 108 could be Ethernet connections such as Gigabit Ethernet (GbE) or 10 GbE between WDM terminals and/or Ethernet switches. Of course, other types of connections are contemplated for the connections 106, 108. In an exemplary embodiment, the connections 106, 108 can be a linear 0:1 connection or 1+1 connections over the same links 104.

FIG. 2 illustrates the network 100 showing two connections 110, 112 that are part of the core network. The connection 110 is between the nodes 102b, 102i traversing the intermediate nodes 102d, 102f, 102g, 102h and the links 104d, 104e, 104f, 104g, 104h. The connection 112 is also between the nodes 102b, 102i traversing the intermediate node 102j and the links 104j, 104i. Note, the connections 110, 112 can be all-optical between the intermediate nodes via reconfigurable optical add/drop multiplexers (ROADMs) or the like as well as being regenerated at one or more of the intermediate nodes. The connections 110, 112 can be the same connection with 1+1 protection, i.e. the connection 110 is working and the connection 112 is protection or vice versa. Alternatively, the connections 110, 112 can be diverse linear connections that use mesh restoration therebetween. Further, the connections 110, 112 can be diverse sides of a ring protection scheme.

Assume, for example, the access network has no control plane or a control plane separate from the core network. Also, assume the core network has a control plane. In setting up the connections 106, 108, there is no concern for SRLG problems as these connections are linear connections. In setting up the connections 110, 112, the control plane in the core network selects paths as shown in FIG. 2 such that there are no SRLG problems between the connections 110, 112. This is done, as described herein, by denoting SRLG details on the line side in the core network, i.e. none of the links 104 are common between the connections 110, 112.

Assume, again for example, there is a need to create a connection from the access network at the node 102h to the access network at the node 102a. FIG. 3 illustrates the network 100 showing this connection through the connections 106, 108 and the connections 110, 112. Specifically, this connection from the node 102h uses the access network over the connection 108 to the node 102i wherein this connection uses the connection 110 (or the connection 112) to the node 102b. At the node 102b, this connection uses the connection 106 to the node 102a. This connection between the nodes 102a, 102h can be set up through the control plane and/or manually.

From the perspective of both the access and the core networks, there are no SRLG problems with respect to any of the connections 106, 108, 110, 112. However, when the network 100 is viewed in FIG. 3 overlaying the access network and the core network, it is shown that there is a SRLG 120 on the link 104h and a SRLG 122 on the link 104d. That is, the access network and the core network share the links 104d, 104h. Using conventional techniques, this is not known individually to either the access network or the core network as SRLG is tied to line interfaces in each of the networks, which is not shared therebetween.

To circumvent this constraint, the SRLG systems and methods assign SRLG details to drop ports of each connection as is described herein.

Figure 4:
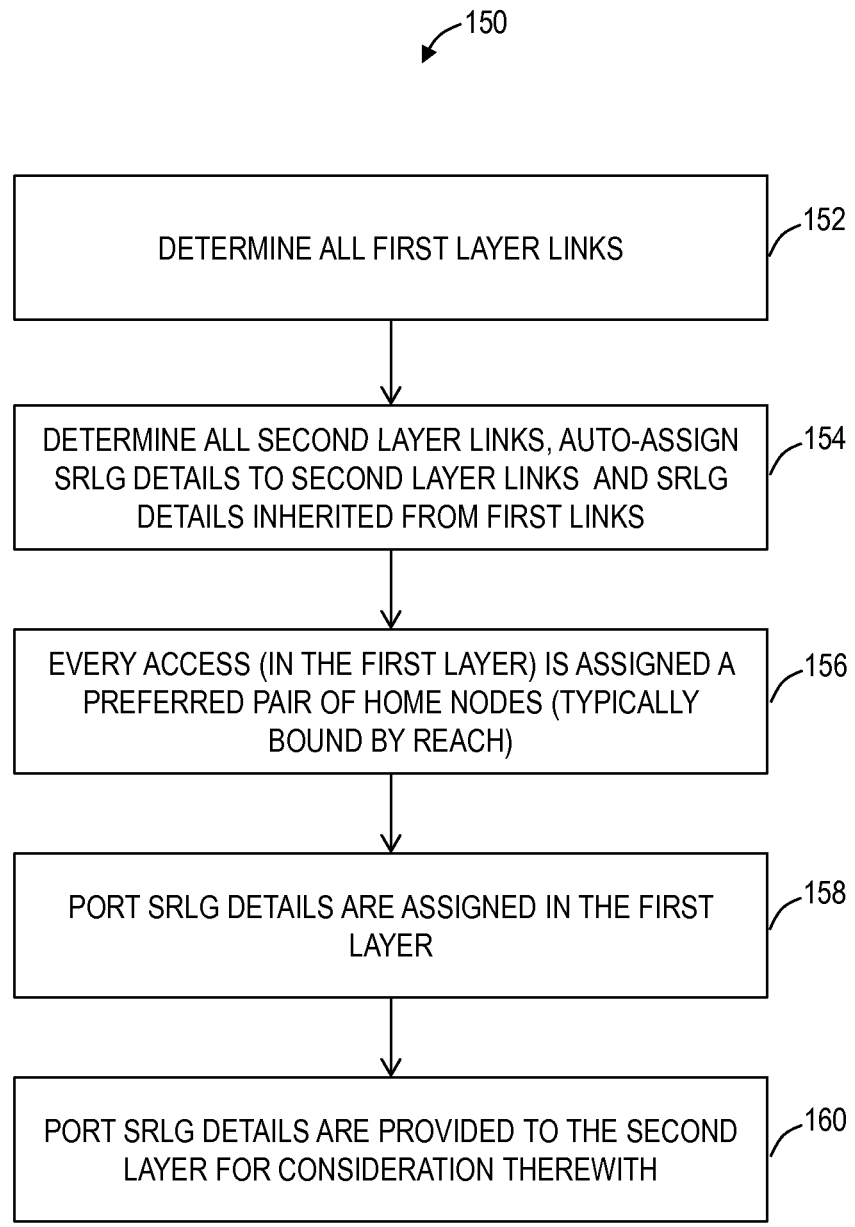
FIG. 4 is a flowchart of an SRLG method for use with the network of FIGS. 1-3.

Referring to FIG. 4, in an exemplary embodiment, a flowchart illustrates an SRLG method 150 for use with the network 100. The SRLG method 150 operates between two network layers in an overall network, e.g., the access network and the core network, a dense WDM (DWDM) network and an OTN network, and the like. The overall goal of the SRLG method 150 is to convey SRLG data from a lower or another layer network to a higher or another layer network for consideration therewith in route selection. First, the SRLG method 150 includes determining all links at a first layer (step 152). This includes labeling all links and assigning data thereto such as, for example, fiber number, fiber bundle, conduit information, etc. In the descriptions herein, this step is illustrated as simply providing a link number for simplicity, but those of ordinary skill in the art will recognize it can include additional information. The step 152 can be performed manually by an operator or automatically through a planning tool or the like.

Next, the SRLG method 150 includes determining all second layer links (step 154). This includes auto-assigning SRLG details to all second layer links as well as inheriting all SRLG details from first layer links. The SRLG method 150 includes assigning every access in the first layer a preferred pair of home nodes (step 156). The SRLG method 150 includes assigning port SRLG details in the first layer based on the preferred pair of home nodes (step 158). As part of an interlayer call for a connection between the first and second layers, the port SRLG details are provided to the second layer for consideration therewith (step 160).

Figure 5:
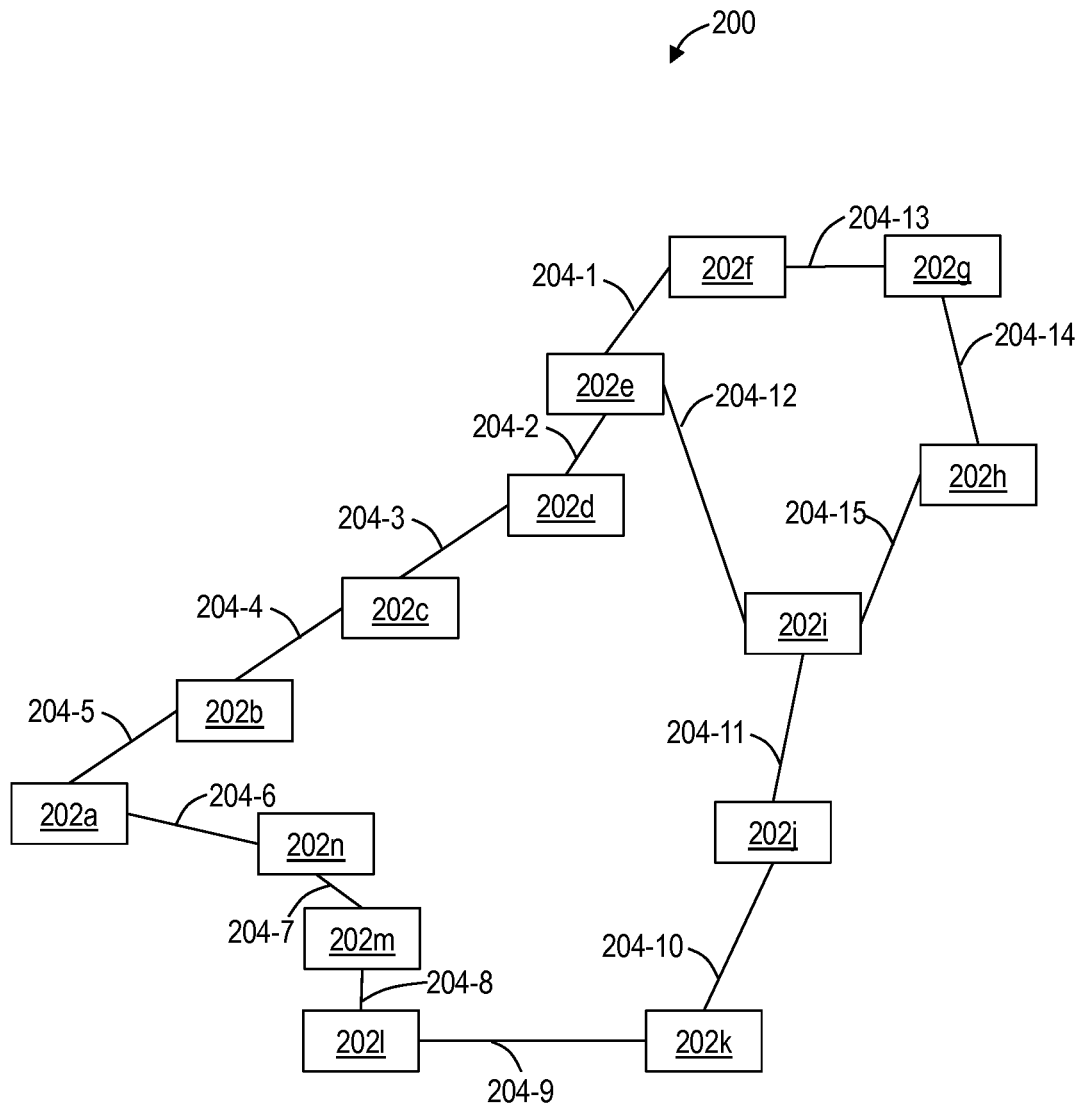
FIG. 5 is a network diagram of a network of various interconnected nodes showing links determined at a first layer or network.

Referring to FIGS. 5-9, in an exemplary embodiment, network diagrams illustrate a network 200 of various interconnected nodes 202a-202n for an exemplary illustration of the SRLG method 150. The nodes 202a-202n are interconnected via links 204-1-204-15. Note, the nodes 202a-202n and the links 204-1-204-15 can have similar characteristics as in the network 100 with the nodes 102a-102l and the links 104a-104n. The network 200, for illustration purposes, includes two exemplary layers: an optical layer with DWDM, i.e., a layer 0 (L0), and an OTN layer, i.e., a layer 1 (L1). That is, for the method 150, the first layer is DWDM or L0 and the second layer is OTN or L1. FIG. 5 includes a diagram of the network 200 with all L0 links determined (step 152). As described herein, for illustration purposes, each of the L0 links is determining by simply its label as link 204-XX.

Figure 6:
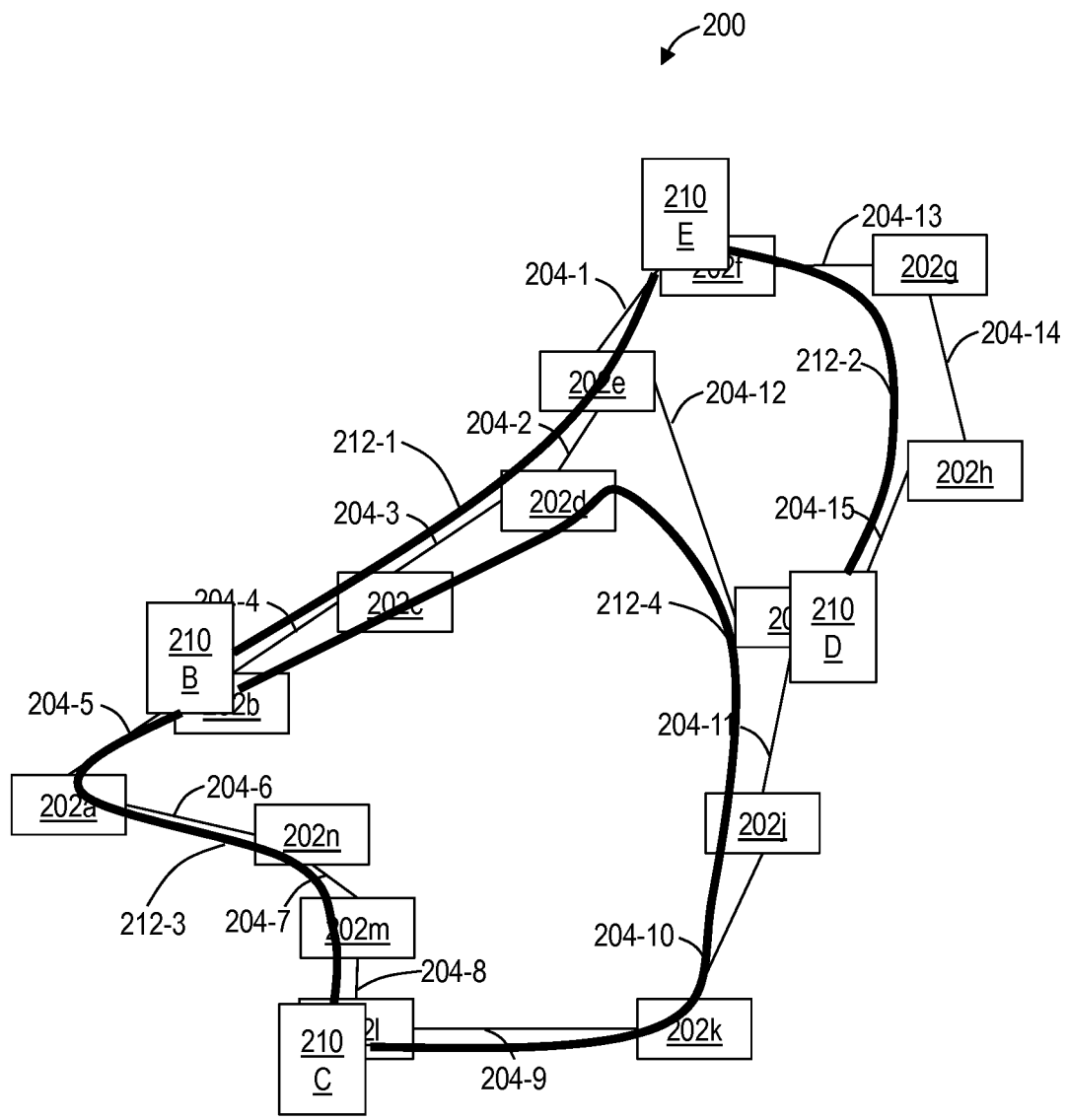
FIG. 6 is a network diagram of the network of FIG. 5 showing links determined at a second layer or network.

In FIG. 6, layer two links, i.e., OTN links, are determining (step 154). In this example, there are four OTN network elements 210B, 210C, 210D, 210E. The network element 210B is located at the node 202b, the network element 210C is located at the node 2021, the network element 210D is located at the node 202i, and the network element 210E is located at the node 202f. There are four OTN links 212-1, 212-2, 212-3, 212-4. The OTN link 212-1 is between the network elements 210B, 210E, the OTN link 212-2 is between the network elements 210E, 210D, and the OTN links 212-3, 212-4 are between the network elements 210B, 210C on diverse paths in the network 200. These OTN links 212-1, 212-2, 212-3, 212-4 have SRLG details as follows after inheriting the SRLG details from the DWDM layer:

| Link ID | Link # | SRLG |
| --- | --- | --- |
| EB - link 212-1 | 1 | Links 204-1, 204-2, 204-3, 204-4 |
| ED - link 212-2 | 2 | Links 204-13, 204-14, 204-15 |
| BC-short - link 212-3 | 3 | Links 204-5, 204-6, 204-7, 204-8 |
| BC-long - link 212-4 | 4 | Links 204-4, 204-3, 204-2, 204-12, 204-11, 204-10, 204-9 |

Figure 7:
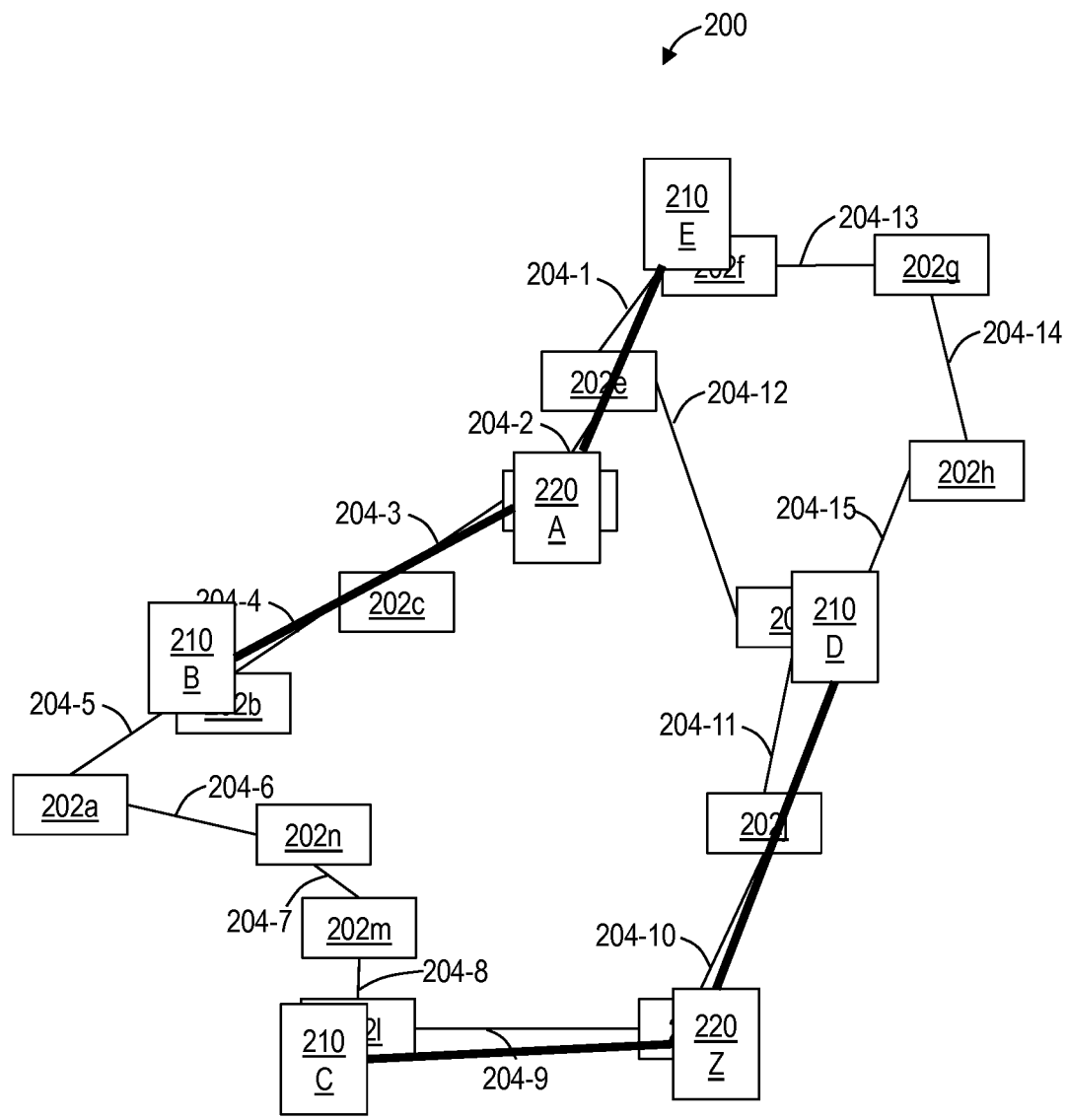
FIG. 7 is a network diagram of the network of FIGS. 5-6 showing call segments or pairs of home nodes for the first layer or network.
Figure 8:
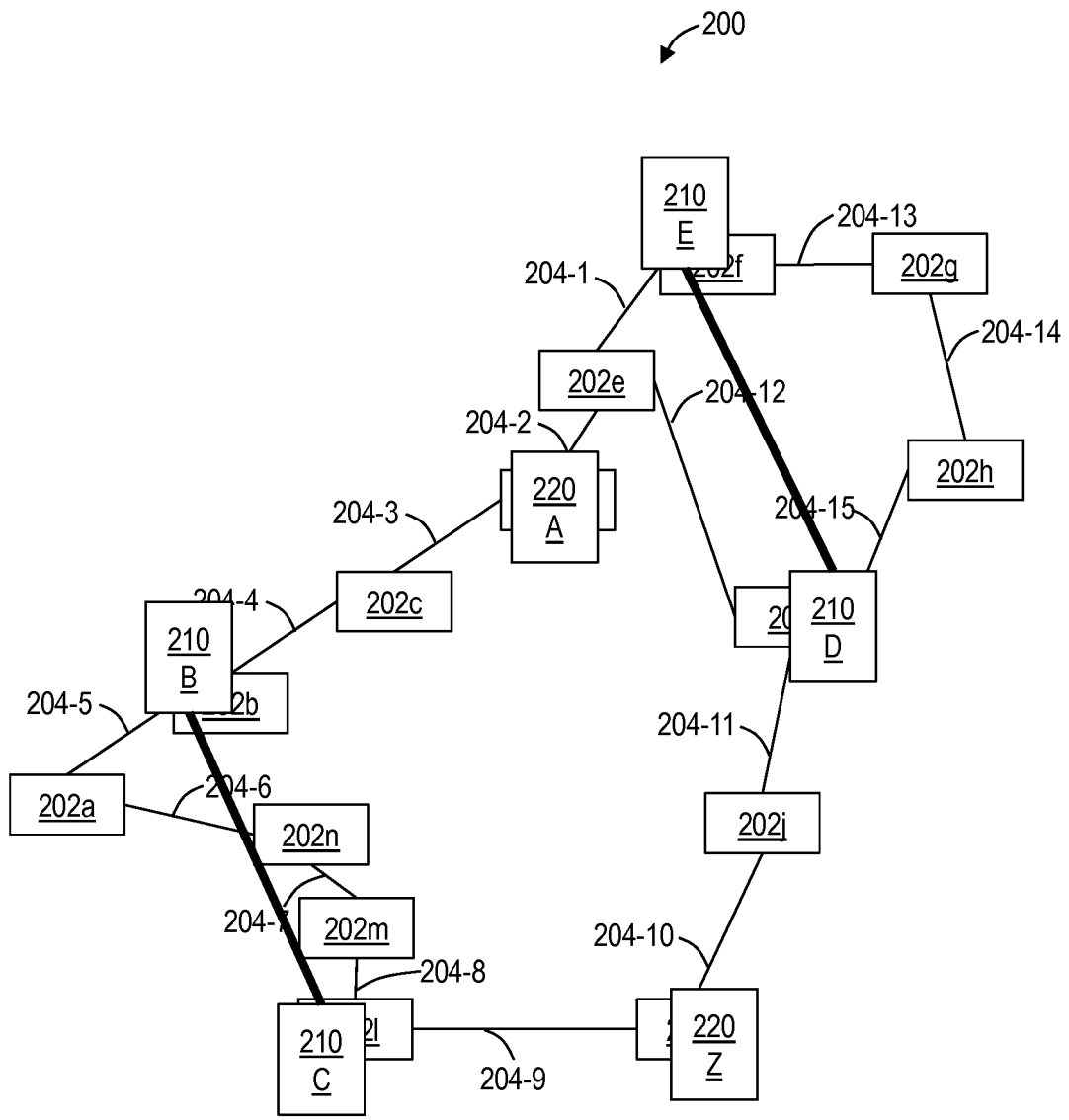
FIG. 8 is a network diagram of the network of FIGS. 5-7 showing call segments for the second layer or network.
Figure 9:
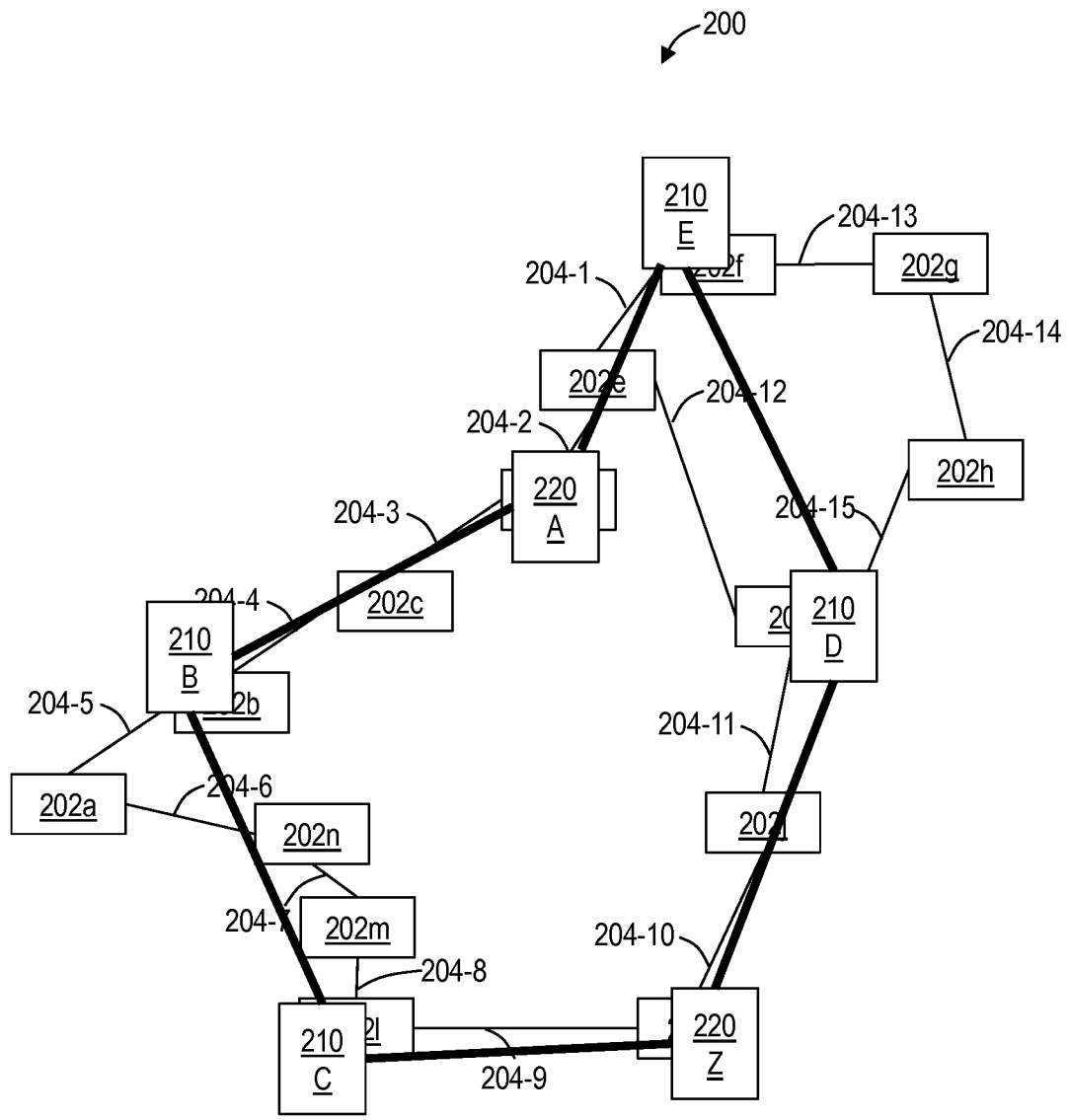
FIG. 9 is a network diagram of the network of FIGS. 5-8 showing call segments for both the first and second layer or network.

Next, in FIG. 7, every access in the first layer (L0) is assigned a preferred pair of home nodes (typically bound by reach) (step 156). For example L0 network elements 220A, 220Z are assigned home nodes. The L0 network element 220A has home nodes of the network elements 210B, 210E, and the L0 network element 220Z has home nodes of the network elements 210C, 210D. The home nodes show how the L0 network elements 220A, 220Z can access the L1 network elements 210B, 210C, 210D, 210E, i.e. the L0 call segments. In FIG. 8, the OTN call segments are shown between the network elements 210E, 210D and the network elements 210B, 210C. In FIG. 9, an overall call is shown between the network elements 220A, 220Z using the OTN call segments. From a network element perspective, the overall call appears node diverse from the network elements 210A→→210E→→210D→→210Z and from the network elements 210A→210B→210C→210Z.

From the perspective of SRLG diversity, the overall call also appears node diverse. Specifically, the path from the network elements 210A→210E→210D→210Z takes the links 204-2, 204-1, 204-13, 204-14, 204-15, 204-10, 204-11 and the path from the network elements 210A→210B→210C→210Z takes the links 204-3, 204-4, 204-5, 204-6, 204-7, 204-8, 204-9. Note, the OTN call segment between the network elements 210B, 210C uses the connection 212-3. However, what if the connection 212-3 fails, the OTN call segment could not switch to the connection 212-4 and maintain diversity. Specifically, the connection 212-4 has three common links with the L1 call segments, namely the links 204-2, 204-11, 204-10. However, because of control plane segmentation, SRLG passes at L1 but not when taken as a whole considering the L0 connections.

As described herein, SRLG information is only recorded against NNI (line) bandwidth in the L1 control plane. For the L1 OTN network elements 210B, 210C, 210D, 210E, assigning access network SRLG details to the drop port provides the OTN control plane with the access networks topology and allows the OTN control plane to consider drop port SRLG information in its absolute link diverse path computation. As part of the interlayer call from the access network to the core network, port SRLG details are assigned as follows:

| Network Element | Drop Port | SRLG |
| --- | --- | --- |
| 210B | 1 | Links 204-4, 204-3 |
| 210C | 2 | Link 204-9 |
| 210D | 3 | Links 204-11, 204-10 |
| 210E | 4 | Links 204-1, 204-2 |

Note, the above table provides the drop port SRLG information from the network elements 220A, 220Z to their OTN counterparts. With the above information, the L1 control plane can determine that the connection 212-4 is not suitable for rerouting the connection 212-3 as this fails to maintain absolute route diversity with the lower or another layer network, i.e., the DWDM network. Advantageously, this provides a mechanism to communicate SRLG details between networks since links may not be unique, but the SRLG details are.

Figure 10:
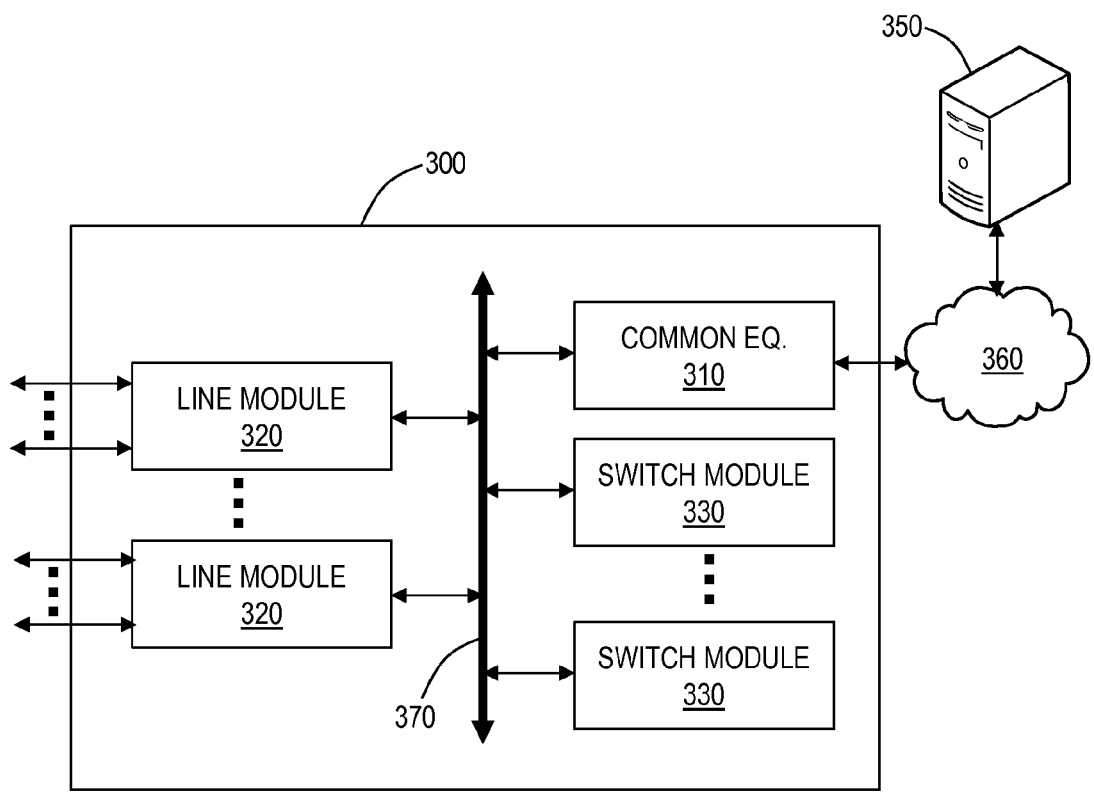
FIG. 10 is a block diagram of an exemplary implementation of a network element.

Referring to FIG. 10, in an exemplary embodiment, a block diagram illustrates an exemplary network element 300 for the SRLG systems and methods. In an exemplary embodiment, the exemplary network element 300 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the network element 300 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the network element 300 can be any digital system with ingress and egress digital signals and switching therebetween of channels, timeslots, tributary units, etc. utilizing OTN, SONET, SDH, etc. While the network element 300 is generally shown as an optical network element, the SRLG systems and methods contemplated for use with any switching fabric, network element, or network based thereon.

In an exemplary embodiment, the network element 300 includes common equipment 310, one or more line modules 320, and one or more switch modules 330. The common equipment 310 can include power; a control module; operations, administration, maintenance, and provisioning (OAM&P) access; user interface ports; and the like. The common equipment 310 can connect to a management system 350 through a data communication network 360. The management system 350 can include a network management system (NMS), element management system (EMS), or the like. Additionally, the common equipment 310 can include a control plane processor configured to operate a control plane as described herein. The network element 300 can include an interface 370 for communicatively coupling the common equipment 310, the line modules 320, and the switch modules 330 therebetween. For example, the interface 370 can be a backplane, mid-plane, a bus, optical or electrical connectors, or the like. The line modules 320 are configured to provide ingress and egress to the switch modules 330 and external to the network element 300. In an exemplary embodiment, the line modules 320 can form ingress and egress switches with the switch modules 330 as center stage switches for a three-stage switch, e.g. a three stage Clos switch. Other configurations and/or architectures are also contemplated. The line modules 320 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 320 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 320 can include wavelength division multiplexing interfaces, short reach interfaces, and the like, and can connect to other line modules 320 on remote network elements, end clients, edge routers, and the like. From a logical perspective, the line modules 320 provide ingress and egress ports to the network element 300, and each line module 320 can include one or more physical ports. For example, the line modules 320 can form the links 104, 204 described herein. The switch modules 330 are configured to switch channels, timeslots, tributary units, etc. between the line modules 320. For example, the switch modules 330 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 330 can include both Time Division Multiplexed (TDM) (i.e., circuit switching) and packet switching engines. The switch modules 330 can include redundancy as well, such as 1:1, 1:N, etc. In an exemplary embodiment, the switch modules 330 provide OTN, SONET, or SDH switching.

Those of ordinary skill in the art will recognize the network element 300 can include other components which are omitted for illustration purposes, and that the systems and methods described herein are contemplated for use with a plurality of different network elements with the network element 300 presented as an exemplary type of network element. For example, in another exemplary embodiment, the network element 300 may not include the switch modules 330, but rather have the corresponding functionality in the line modules 320 (or some equivalent) in a distributed fashion. For the network element 300, other architectures providing ingress, egress, and switching therebetween are also contemplated for the systems and methods described herein. In general, the systems and methods described herein contemplate use with any network element providing switching of OTN, SONET, SDH, etc. channels, timeslots, tributary units, wavelengths, etc.

Figure 11:
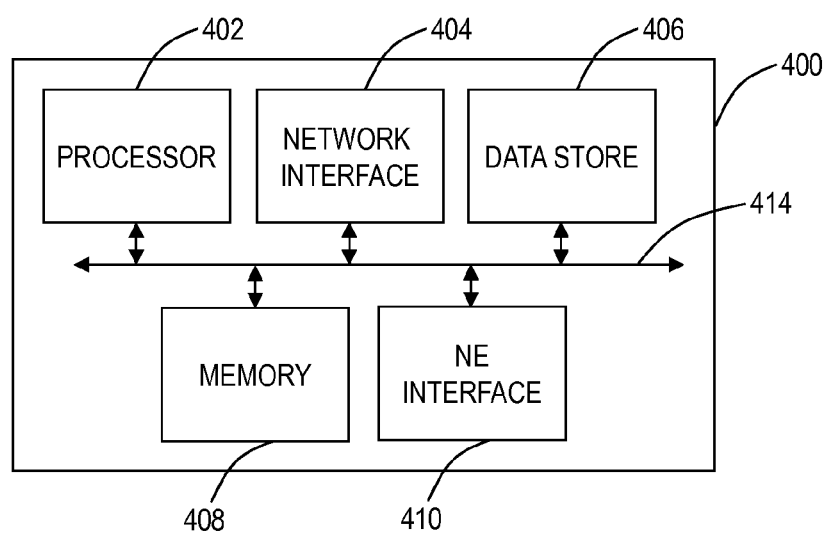
FIG. 11 is a block diagram of an exemplary controller such as for the network element of FIG. 10.

Referring to FIG. 11, in an exemplary embodiment, a block diagram illustrates a controller 400 to provide control plane processing and/or operations, administration, maintenance, and provisioning (OAM&P) for a node such as the network element 300. The controller 400 can be part of common equipment, such as common equipment 310 in the network element 300. The controller 400 can include a processor 402 which is hardware device for executing software instructions such as operating the control plane. The processor 402 can be any custom made or commercially available processor, a central processing unit (CPU), an auxiliary processor among several processors associated with the controller 400, a semiconductor-based microprocessor (in the form of a microchip or chip set), or generally any device for executing software instructions. When the controller 400 is in operation, the processor 402 is configured to execute software stored within memory, to communicate data to and from the memory, and to generally control operations of the controller 400 pursuant to the software instructions. The controller 400 can also include a network interface 404, a data store 406, memory 408, a network element interface 410, and the like, all of which are communicatively coupled therebetween and with the processor 402.

The network interface 404 can be used to enable the controller 400 to communicate on a network, such as to communicate control plane information to other controllers, to the management system 360, and the like. The network interface 404 can include, for example, an Ethernet card (e.g., 10BaseT, Fast Ethernet, Gigabit Ethernet) or a wireless local area network (WLAN) card (e.g., 802.11a/b/g). The network interface 404 can include address, control, and/or data connections to enable appropriate communications on the network. The data store 406 can be used to store data, such as control plane information, provisioning data, OAM&P data, etc. The data store 406 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 406 can incorporate electronic, magnetic, optical, and/or other types of storage media. The memory 408 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 408 may incorporate electronic, magnetic, optical, and/or other types of storage media. Note that the memory 408 can have a distributed architecture, where various components are situated remotely from one another, but may be accessed by the processor 402.

The network element interface 410 includes components for the controller 400 to communicate to other devices in a node, such as through the local interface 370. The components (402, 404, 406, 408, 410) are communicatively coupled via a local interface 414. The local interface 414 and the network element interface 410 can be, for example but not limited to, one or more buses or other wired or wireless connections, as is known in the art. The local interface 414 and the network element interface 410 can have additional elements, which are omitted for simplicity, such as controllers, buffers (caches), drivers, repeaters, and receivers, among many others, to enable communications. Further, the local interface 414 and the network element interface 410 can include address, control, and/or data connections to enable appropriate communications among the aforementioned components.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A method implemented by a controller associated with one or more nodes of a network, comprising:
   determining all links at a first layer of the network;
   determining all links at a second layer of the network, wherein the first layer and the second layer are different layers, and wherein the second layer is a higher layer network that operates over a lower layer network comprising the first layer;
   assigning shared risk link group details inherited from the links at the first layer to the links at the second layer;
   assigning access in the first layer to associated links in the second layer;
   defining drop side port shared risk link group details to the links in the first layer based on the associated links in the second layer; and
   providing the drop side port shared risk link group details to the second layer, wherein drop ports interface the first layer and the second layer such that the drop side port shared risk link group details associated with the first layer are provided to the second layer.

2. The method of claim 1, further comprising:
   operating a control plane in the second layer; and
   calculating paths over the links in the second layer via the control plane while considering shared risk link group details in the second layer.

3. The method of claim 2, wherein the shared risk link group details in the second layer are based on line side interfaces of the links in the second layer.

4. The method of claim 2, further comprising:
   initiating a call for a connection spanning the first layer and the second layer;
   providing the drop side port shared risk link group details associated with the connection; and
   calculating a path for the connection in the second layer utilizing the drop side port shared risk link group details to ensure absolute route diversity between the first layer and the second layer as a whole.

5. The method of claim 2, further comprising:
   propagating shared risk link group details from the first layer to a drop port in the second layer.

6. The method of claim 4, wherein the drop side port shared risk link group details in the first layer are based on drop side ports of the links in the first layer.

7. The method of claim 1, wherein the drop side port shared risk link group details comprise any of a fiber number, a fiber bundle identifier, and a conduit identifier.

8. The method of claim 1, wherein the first layer comprises an access network and the second layer comprises a core network, wherein each of the access network and the core network have at least one overlapping link providing a shared risk link group therebetween, and the method further comprising:
   routing a connection spanning the access network and the core network with absolute route diversity guaranteed therebetween based on the drop side port shared risk link group details provided to a control plane in the core network.

9. The method of claim 1, wherein the first layer comprises a wavelength division multiplexing (WDM) network and the second layer comprises an Optical Transport Network (OTN) network, wherein each of the WDM network and the OTN network have at least one overlapping link providing a shared risk link group therebetween, and the method further comprising:
   routing a connection spanning the WDM network and the OTN network with absolute route diversity guaranteed therebetween based on the drop side port shared risk link group details provided to a control plane in the OTN network.

10. A network, comprising:
    a first network comprising a first plurality of network elements interconnected by a first plurality of links, wherein each of the first plurality of network elements comprise circuitry configured to switch one or more of digital signals and optical signals between one another; and
    a second network comprising a second plurality of network elements interconnected by a second plurality of links, wherein each of the second plurality of network elements comprise circuitry configured to switch digital signals between one another, wherein the first network and the second network are different networks, wherein the second network is a higher layer network that operates over a lower layer network comprising the first network, and wherein a control plane operates within the second network,
    wherein each of the first plurality of network elements is assigned associated links in the second network for access,
    wherein each of the first plurality of network elements comprise drop ports which have defined drop side port shared risk link group details based on the assigned associated links in the second network, wherein the drop ports interface the first network and the second network such that the drop side port shared risk link group details are shared between the first network and the second network, and
    wherein the drop side port shared risk link group details associated with the first network are provided to the control plane of the second network for routing consideration.

11. The network of claim 10, wherein the control plane is configured to calculate paths over the second plurality of links while considering shared risk link group details in the second network.

12. The network of claim 11, wherein the shared risk link group details in the second network are based on line side interfaces of the second plurality of links.

13. The network of claim 10, wherein the control plane is configured to:
    initiate a call for a connection spanning the first network and the second network;
    receive the drop side port shared risk link group details associated with the connection; and
    calculate a path for the connection in the second network utilizing the drop side port shared risk link group details to ensure absolute route diversity between the first network and the second network as a whole.

14. The network of claim 10, wherein the control plane is configured to:
    propagate shared risk link group details from the first network to a drop port in the second network.

15. The network of claim 10, wherein the drop side port shared risk link group details in the first network are based on drop side ports of the first plurality of links.

16. The network of claim 10, wherein the drop side port shared risk link group details comprise any of a fiber number, a fiber bundle identifier, and a conduit identifier.

17. The network of claim 10, wherein the first network comprises an access
network and the second network comprises a core network, wherein each of the access network and the core network have at least one overlapping link providing a shared risk link group therebetween, and the control plane is configured to:
route a connection spanning the access network and the core network with absolute route diversity guaranteed therebetween based on the drop side port shared risk link group details provided to a control plane in the core network.

18. The network of claim 10, wherein the first network comprises a wavelength division multiplexing (WDM) network and the second network comprises an Optical Transport Network (OTN) network, wherein each of the WDM network and the OTN network have at least one overlapping link providing a shared risk link group therebetween, and the control plane is configured to:
route a connection spanning the WDM network and the OTN network with absolute route diversity guaranteed therebetween based on the drop side port shared risk link group details provided to a control plane in the OTN network.

19. A network element, comprising:
one or more line ports;
a switching mechanism between the one or more line ports, wherein the switching mechanism comprises circuitry configured to switch one or more of channels, timeslots, tributary units, packets, and wavelengths; and
a controller communicatively coupled to the one or more line ports and the switching mechanism, wherein a control plane operates on the controller and the controller is configured to:
obtain shared risk link group information for links at a layer in which the network element operates;
receive drop side port shared risk link group details from another network element operating at a different layer but sharing a connection through the network element, wherein the network element is a higher layer network element that operates over a lower layer network element comprising the other network element operating at the different layer; and
calculate a path for the connection based on the shared risk link group information and the drop side port shared risk link group details thereby guaranteeing absolute route diversity for the connection through the layer and the different layer, wherein drop ports interface the layer and the different layer such that the drop side port shared risk link group details associated with the layer are shared between the layer and the different layer.

20. The network element of claim 19, wherein the shared risk link group information is based on line side interfaces in the layer, and wherein the drop side port shared risk link group details is based on drop side ports in the different layer.

* * * * *